United States Patent
Lee

(10) Patent No.: US 10,968,812 B2
(45) Date of Patent: Apr. 6, 2021

(54) TEMPERATURE RESPONSIVE VARIABLE WATER PUMP AND ENGINE COOLING SYSTEM

(71) Applicants: Hyundai Motor Company, Seoul (KR); Kia Motors Corporation, Seoul (KR)

(72) Inventor: Hyo-Jo Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/680,882

(22) Filed: Nov. 12, 2019

(65) Prior Publication Data

US 2020/0263597 A1 Aug. 20, 2020

(30) Foreign Application Priority Data

Feb. 18, 2019 (KR) .................... 10-2019-0018390

(51) Int. Cl.
| | |
|---|---|
| *F01P 7/16* | (2006.01) |
| *F16K 31/00* | (2006.01) |
| *F01P 5/10* | (2006.01) |
| *F16K 11/02* | (2006.01) |
| *F04D 15/00* | (2006.01) |
| *F04D 29/58* | (2006.01) |
| *F04D 1/04* | (2006.01) |

(52) U.S. Cl.
CPC ............... *F01P 7/162* (2013.01); *F01P 5/10* (2013.01); *F01P 7/16* (2013.01); *F04D 1/04* (2013.01); *F04D 15/0022* (2013.01); *F04D 29/5806* (2013.01); *F16K 11/022* (2013.01); *F16K 31/002* (2013.01); *F01P 7/167* (2013.01)

(58) Field of Classification Search
CPC .... F01P 7/162; F01P 5/10; F01P 7/167; F01P 2007/146; F01P 3/02; F01P 7/02; F01P 5/12; F16K 11/022; F16K 31/002; F16K 31/528; F04D 15/0022; F04D 29/5806; F04D 1/04
See application file for complete search history.

(56) References Cited

U.S. PATENT DOCUMENTS

| | | | | |
|---|---|---|---|---|
| 6,112,706 | A * | 9/2000 | Heer | ......................... F01P 5/10 |
| | | | | 123/41.1 |
| 9,212,620 | B2 * | 12/2015 | Berkemeier | ............ F02F 1/243 |
| 2010/0181516 | A1 * | 7/2010 | Palanchon | ......... G05D 23/1333 |
| | | | | 251/324 |

(Continued)

FOREIGN PATENT DOCUMENTS

KR 20180021982 A 3/2018

*Primary Examiner* — Syed O Hasan
(74) *Attorney, Agent, or Firm* — Mintz Levin Cohn Ferris Glovsky and Popeo, P.C.; Peter F. Corless

(57) ABSTRACT

A water pump of an engine cooling system includes a thermal valve that divides an outlet space of a pump housing of an outlet port, through which the engine coolant pumped into the internal space of a pump housing is discharged, into a front end discharge region and a rear end discharge region. The thermal valve also forms a dual flow path through which the engine coolant is discharged to the front end discharge region and the rear end discharge region according to the increase of the coolant temperature. The cooling of a cylinder block and a cylinder head of an engine are thus separately adjusted.

13 Claims, 8 Drawing Sheets

(56) References Cited

U.S. PATENT DOCUMENTS

| | | | |
|---|---|---|---|
| 2014/0209046 A1* | 7/2014 | Steiner | F01P 5/10 |
| | | | 123/41.31 |
| 2016/0090895 A1* | 3/2016 | Sakurai | F01P 1/06 |
| | | | 123/41.1 |
| 2018/0172009 A1* | 6/2018 | Hill | F01P 7/167 |
| 2019/0112965 A1* | 4/2019 | Lee | F01P 7/165 |

* cited by examiner

TEMPERATURE RESPONSIVE VARIABLE WATER PUMP AND ENGINE COOLING SYSTEM

CROSS-REFERENCE TO RELATED APPLICATION

This application claims priority to Korean Patent Application No. 10-2019-0018390, filed on Feb. 18, 2019, which is incorporated herein by reference in its entirety.

BACKGROUND

Field of the Invention

The present invention relates to a water pump and an engine cooling system and, more particularly, to an engine cooling system that uses a temperature responsive variable water pump to adjust a flow rate based on a coolant temperature.

Description of Related Art

In general, a water pump applied to an engine cooling system for vehicles is classified into a mechanical water pump and a variable water pump (i.e., an electric water pump). For example, the mechanical water pump operates regardless of the number of revolutions of the engine, whereas the variable water pump has an advantage of adjusting a flow rate based on the engine and environmental factors regardless of the number of revolutions of the engine.

In particular, since the variable water pump has a complex structure and uses a control mechanism to adjust a flow rate, it may be difficult to apply the variable water pump with ease in consideration of its function and cost. Nevertheless, the variable water pump is preferred which enables the required flow rate to be changed according to various engine operating conditions because the mechanical water pump is unable to adjust a flow rate in a different manner based on the engine and environmental factors and is therefore disadvantageous in terms of fuel efficiency. However, the mechanical water pump has a simpler structure and is advantageous in terms of price competitiveness in comparison with the variable water pump, while it is required to implement variable flow control for adjusting a flow rate in various manners according to the engine and environmental factors.

SUMMARY

The present invention provides a temperature responsive variable water pump that separately adjusts cooling of a head and a block of an engine by allowing a thermal valve to adjust a coolant flow rate at a front end of an outlet part of the water pump, and particularly achieves an improvement in fuel efficiency and performance through flow optimization as well as rapid response and accurate control while adjusting a discharge flow rate in each part of the engine based on the temperature of coolant by adjusting the thermal valve at the front end of the outlet part of the water pump, and an engine cooling system including the same.

Other objects and advantages of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with an exemplary embodiment of the present invention, a water pump may include a thermal valve configured to adjust a coolant direction in two flow directions within an outlet space of a pump housing. Thus, the water pump is characterized by the thermal valve for defining the outlet space of the pump housing of the fluid, pumped into an internal space of the pump housing, as a dual flow path. The thermal valve may be operated by a change in temperature of the fluid to define the dual flow path. The thermal valve may be operated by an expansion force of wax expanded by a temperature of the fluid.

The thermal valve may be disposed at an outlet port defining the outlet space of the pump housing. The outlet space of a pump housing may be divided into two parts by the thermal valve to define the dual flow path. The thermal valve may include a valve housing for dividing the outlet space of the pump housing into a front end chamber and a rear end chamber, a switching valve moved to switch the front and rear end chambers between a blocked state and a communicated state, and a temperature reactant that applies an expansion force by a temperature of the fluid to the switching valve such that the dual flow path is defined to form a fluid flow through the front end chamber and a fluid flow through the rear end chamber.

The valve housing may include a flow passage therein through which the fluid introduced into the outlet space of the pump housing, may be discharged to the front end chamber when the rear end chamber is blocked by the switching valve, and at the same time the flow passage may include the front and rear end chambers in communication with each other by operating (i.e., opening) the switching valve. The switching valve may be disposed at the front end chamber and moved in a direction away from the rear end chamber. The movement of the switching valve may be supported by a piston moving together with the switching valve when the switching valve is fixed in the valve housing. The piston may include a fixed piston fixed in the valve housing, and a moving piston fixed to the switching valve, and the fixed piston may be fitted to the moving piston to support the movement of the moving piston.

The temperature reactant may be enclosed by a reservoir made of a thermal expansion material, and the reservoir may be coupled to the switching valve to move the switching valve by the expansion force of the temperature reactant. The expansion force of the temperature reactant may be blocked by an elastic repulsive force of a valve spring elastically supporting the switching valve in the front end chamber of the valve housing, and the switching valve may be moved when the expansion force is greater than the elastic repulsive force.

In accordance with another exemplary embodiment of the present invention, an engine cooling system may include a water pump having a thermal valve for dividing an outlet space of a pump housing. of an outlet port, through which engine coolant pumped into an internal space of the pump housing may be discharged, into a front end discharge region and a rear end discharge region and for defining a dual flow path through which the engine coolant may be discharged to the front end discharge region and the rear end discharge region based on an increase in temperature of the coolant, an engine having a cylinder head supplied with the engine coolant through the front end discharge region and a cylinder block supplied with the engine coolant through the rear end discharge region, and a thermostat configured to distribute and circulate the engine coolant.

The thermal valve of the water pump may include wax thermally expanded by the temperature of the engine coolant, and the wax may begin to expand in a high-temperature condition greater than a cold condition and may be fully expanded in a hot condition of the engine to define the dual flow path. The engine may include a water pump mounting block for mounting the water pump, and the water pump mounting block may be formed with a head passage port leading to the cylinder head from the front end discharge region, and a block passage port leading to the cylinder block from the rear end discharge region.

The engine may include a gasket interposed between the cylinder block and the cylinder head, and the gasket may prevent the circulation of the engine coolant between the cylinder block and the cylinder head. The thermostat may have a five-way path such that the engine coolant introduced from the cylinder block and the cylinder head is distributed to and circulates through a radiator connected to a reservoir tank, a cooler, and a heater. The cooler may include an exhaust gas recirculation (EGR) cooler and an oil cooler.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
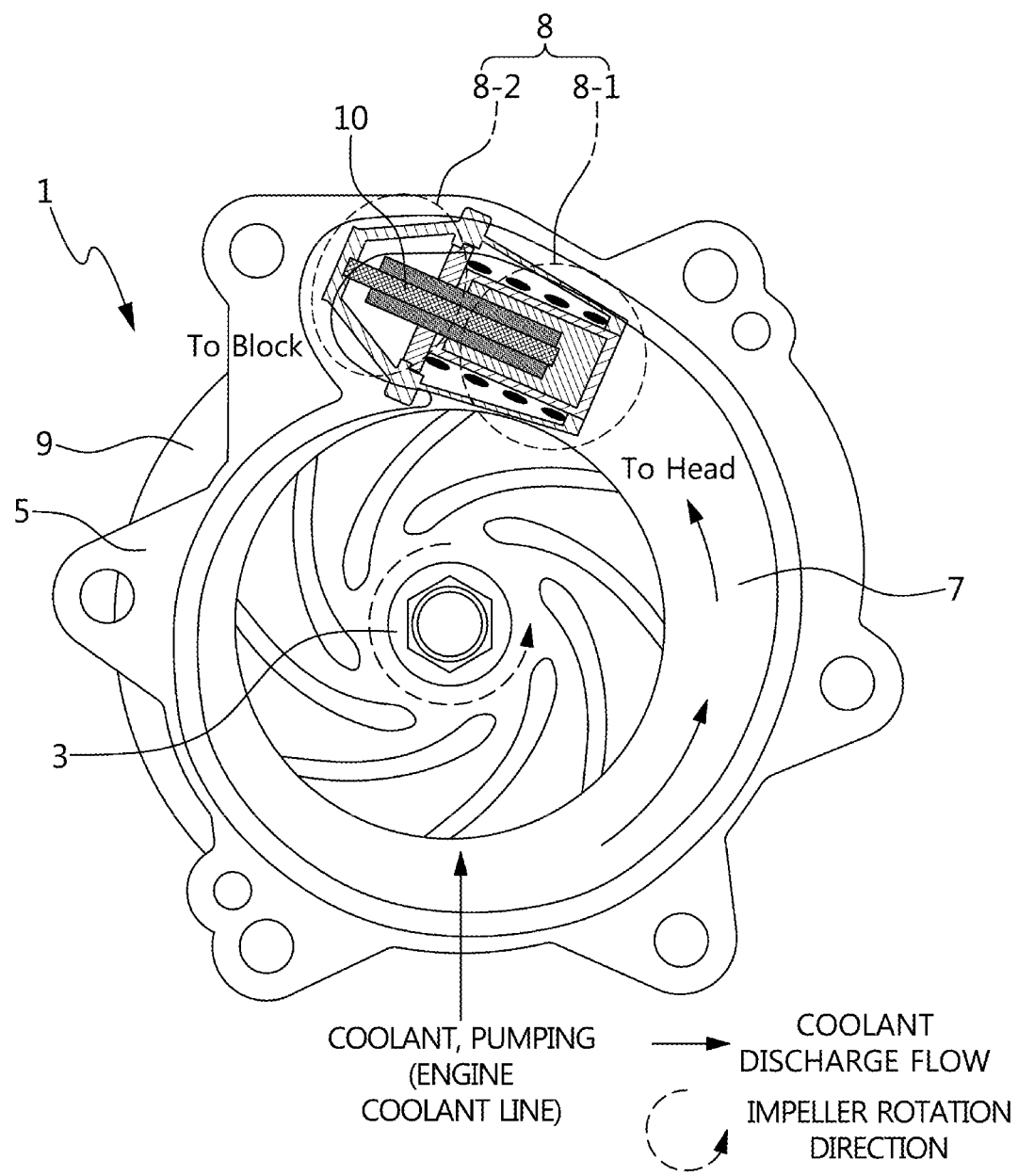
FIG. 1 is a view illustrating a configuration of a temperature responsive variable water pump according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present invention will be described below in more detail with reference to the accompanying drawings. The present invention may, however, be embodied in different forms and should not be construed as limited to the exemplary embodiments set forth herein. Rather, these exemplary embodiments are provided so that this disclosure will be thorough and complete, and will fully convey the scope of the present invention to those skilled in the art. Throughout the disclosure, like reference numerals refer to like parts throughout the various figures and exemplary embodiments of the present invention.

Referring to FIG. 1, a water pump 1 may include an impeller assembly 3, a pump housing 5, and a thermal valve 10. For example, the impeller assembly 3 may be configured to generate a rotational force for suctioning coolant by the rotational force transmitted from an engine, and a fluid (e.g., engine coolant or coolant) may be pumped into a flow chamber 7 defining the internal space thereof and may be discharged to the outside through an outlet port 8 of the pump housing 5. Therefore, the impeller assembly 3, the pump housing 5, the flow chamber 7, and the outlet port 8 are the same as the typical components of the water pump 1.

For example, the thermal valve 10 may be provided the outlet port 8 of the pump housing 5 to be integrated with the water pump 1, and allow the entire region of the outlet port 8 to be divided into a front end discharge region 8-1 and a rear end discharge region 8-2. In particular, the front end discharge region 8-1 is formed such that the coolant introduced into the flow chamber 7 of the pump housing 5 by the rotation of the impeller assembly 3 may flow in a cold condition (e.g., less than about 90° C.) and a high-temperature condition (e.g., from about 90° C. to less than 100° C.) to discharge a minimal amount of coolant through a portion of the total area of the outlet port 8. On the other hand, the rear end discharge region 8-2 is formed such that the coolant may flow in a hot condition (e.g., about 100° C. or greater) to discharge a substantial amount of coolant through the total area of the outlet port 8.

Accordingly, the thermal valve 10 allows the pumped fluid discharged from the outlet port 8 to flow into a front end chamber 21 and a rear end chamber 23 (see FIG. 4), which is characterized in that the water pump 1 a mechanical water pump and operates as a temperature responsive variable water pump using the thermal valve 10. In particular, the opening operation of the thermal valve 10 may be performed in a direction against the force for fluid flow to define a dual flow path. The direction against the force for fluid flow may be made at various positions according to the internal structure of the water pump 1. However, for clarity of explanation, the direction against the force for fluid flow will be described below as being a direction opposite to the direction of the fluid discharged from the water pump 1 to the outlet port 8.

Figure 2A:
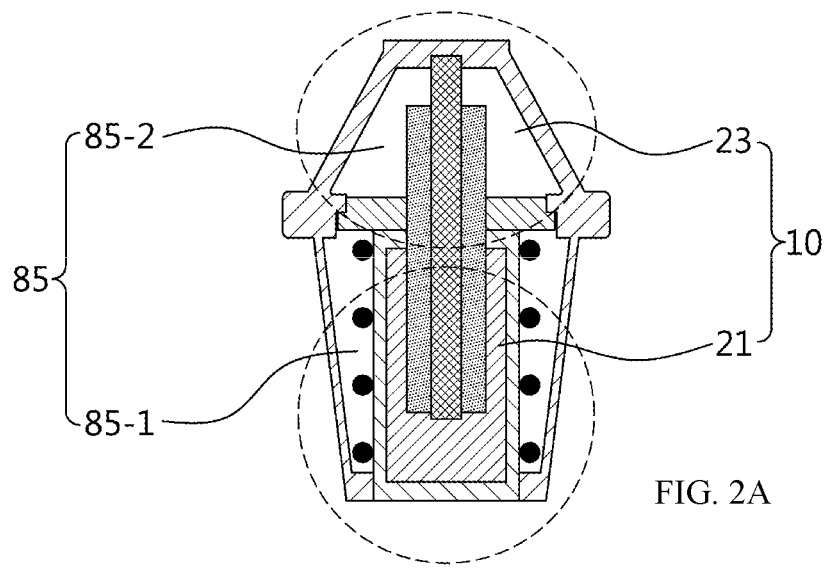
FIGS. 2A-2B illustrate a state in which the temperature responsive variable water pump according to an exemplary embodiment of the present invention is mounted to a cylinder block of an engine.
Figure 2B:
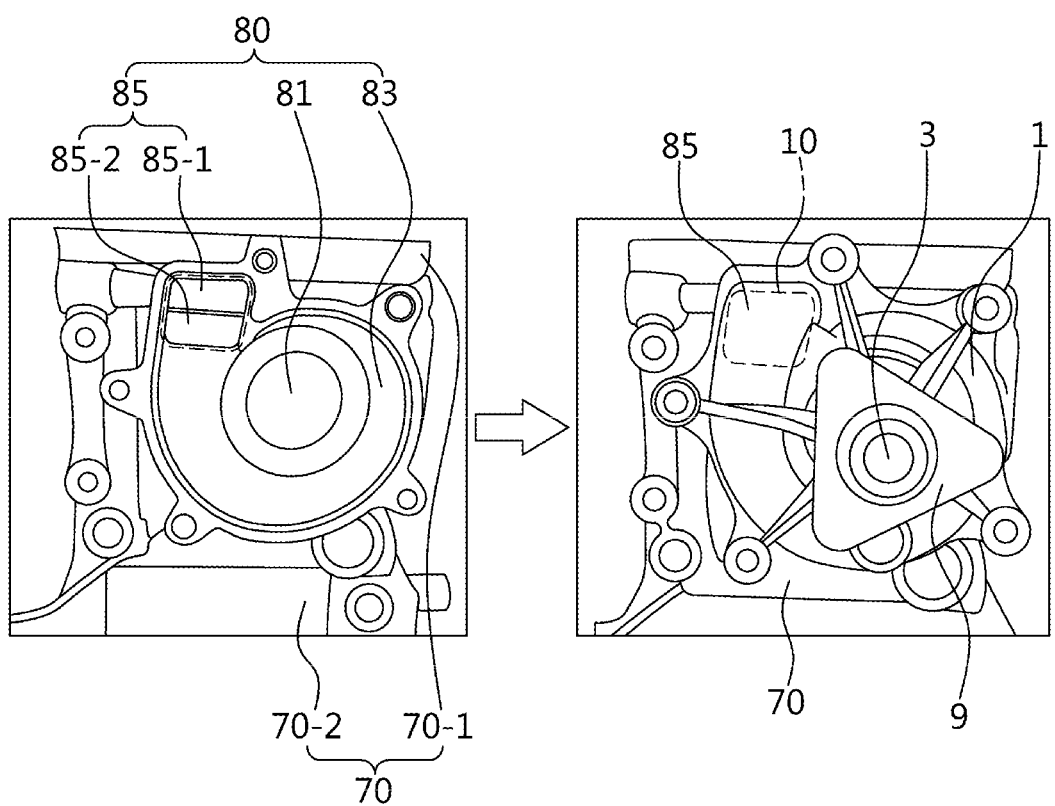

Referring to FIG. 2, the water pump 1 may be connected to an engine 70 through the front end discharge region 8-1 and the rear end discharge region 8-2 of the thermal valve 10. Accordingly, the engine 70 may include a water pump mounting block 80 formed in a cylinder block 70-1 in which coolant circulates in a closed structure by a cylinder head 70-2 and a gasket 70-3, and the water pump mounting block 80 may be provided as a mounting part to which the water pump 1 is bolted or otherwise coupled.

Particularly, the water pump mounting block 80 may form a coolant inlet port 81, a coolant chamber 83, and a partitioned coolant passage port 85. The coolant inlet port 81 may be a passage through which the coolant may be pumped during the rotation of the impeller assembly 3, the coolant chamber 83 may be the same shape as the pump housing 5 so that the flow chamber 7 has a closed structure, and the partitioned coolant passage port 85 coincides with the outlet port 8 of the pump housing 5.

The entire passage area of the partitioned coolant passage port 85 may be divided into a head passage port 85-1 and a block passage port 85-2 by a partition wall. The head passage port 85-1 coincides with the front end discharge region 8-1 of the outlet port 8 and the block passage port 85-2 coincides with the rear end discharge region 8-2 of the outlet port 8. In particular, the head passage port 85-1 leads to the cylinder head 70-2 for the flow of coolant, whereas the block passage port 85-2 leads to the cylinder block 70-1 for the flow of coolant. Therefore, the head passage port 85-1 and the block passage port 85-2 may be separated from each other.

The water pump 1 may include a pump bracket 9 mounted outside the pump housing 5, and the pump bracket 9 may be coupled to the rotary shaft of the pump housing 5 to be used as a fastening part to which a pulley (not shown) may be fastened which is supplied with the rotational force of the engine through a belt. Referring to the water pump flow rate diagram of FIG. 3, it is experimentally demonstrated through the correlation between the discharge flow rate and the coolant temperature that the performance of the temperature responsive variable water pump 1 of the present invention is substantially equivalent to that of a typical variable water pump (i.e., an electric water pump) since the temperature responsive variable water pump 1 follows the typical variable water pump.

This is because a temperature reactant 35 (see FIG. 4) of the thermal valve 10 built in the temperature responsive variable water pump 1 does not respond in the cold condition (A) where the coolant temperature is less than about 90° C., the temperature reactant 35 starts to respond in the high-temperature condition (B) where the coolant temperature is from about 90° C. to less than about 100° C. but the expansion force of the temperature reactant 35 does not overcome the elastic repulsive force of a valve spring 50 (see FIG. 4) and thus, the thermal valve 10 may not be operated (i.e., closed) in the high-temperature condition (B), and the temperature reactant 35 creates a maximum expansion force to overcome the elastic repulsive force of the valve spring 50 in the hot condition (C) where the coolant temperature is greater than about 100° C. Therefore, the thermal valve 10 may be operated (i.e., opened) when the expansion force of the temperature reactant 35 overcomes the elastic repulsive force of the valve spring 50 in the hot condition (C) where the coolant temperature is greater than about 100° C.

Figure 3:
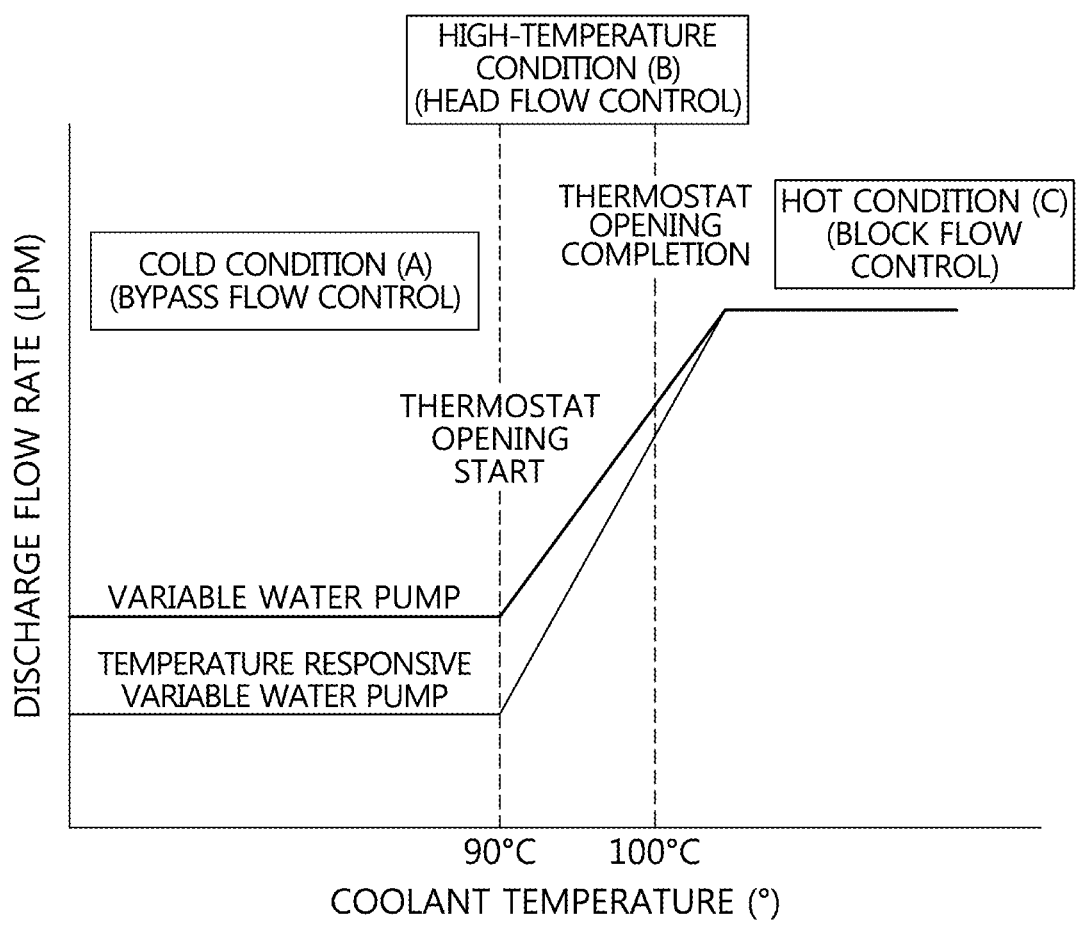
FIG. 3 illustrates a water pump flow-rate diagram varied by operation of a thermal valve of the temperature responsive variable water pump according to an exemplary embodiment of the present invention.
Figure 4:
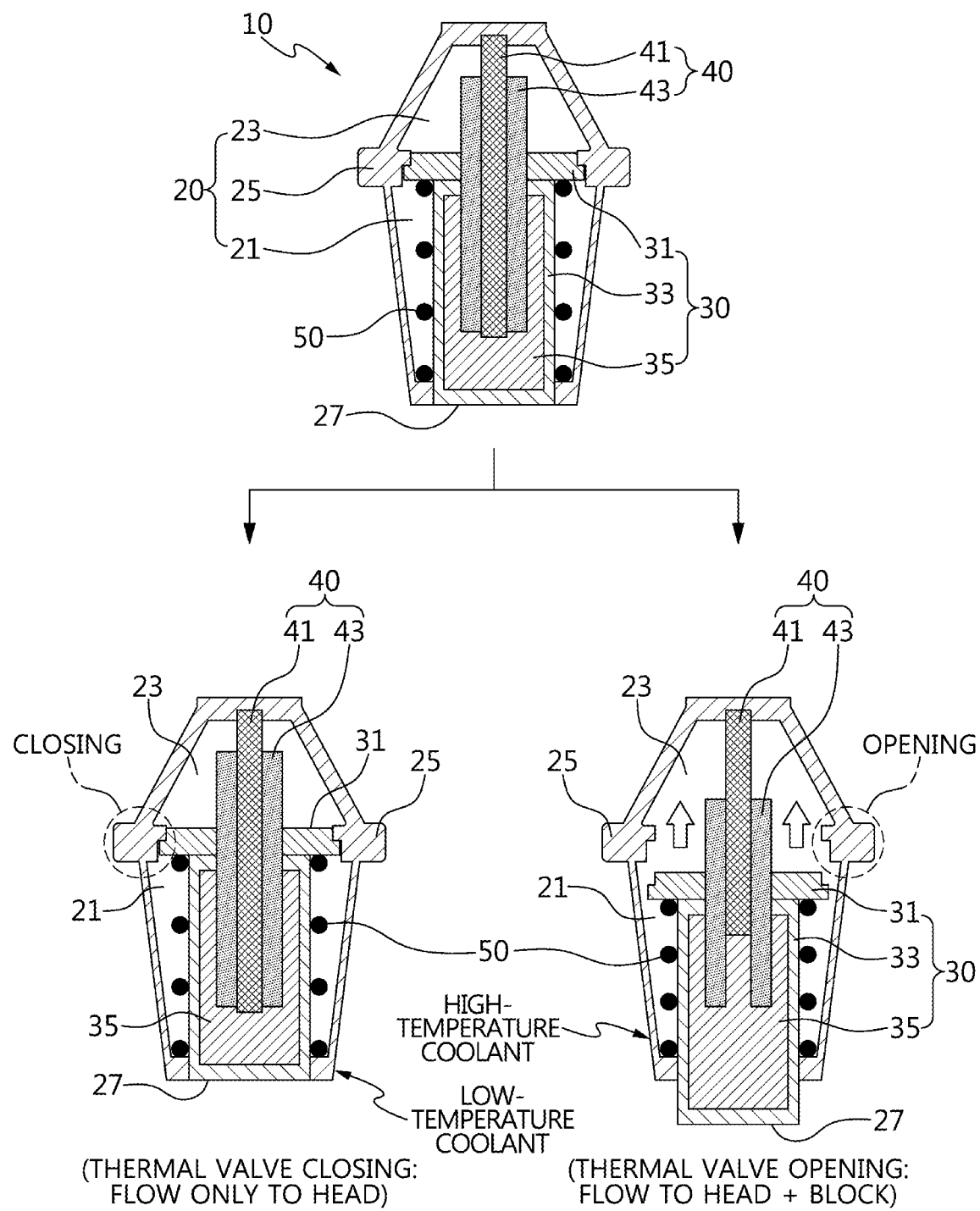
FIG. 4 illustrates a construction and an operation of the thermal valve of the temperature responsive variable water pump according to an exemplary embodiment of the present invention.

FIG. 4 illustrates a detained construction of the thermal valve 10 designed to follow the water pump flow rate diagram of FIG. 3. Referring to FIG. 4, the thermal valve 10 may include a valve housing 20, a switching valve 30, a piston 40, and a valve spring 50.

In particular, the valve housing 20 may include a frame (e.g., a lattice frame or a mesh frame) for introduction of coolant and may include front and rear end chambers 21 and 23, a valve seat 25, and a guide aperture 27. The valve housing 20 may be made of stainless steel or plastic by injection molding. For example, the front end chamber 21 may be in communication with the front end discharge region 8-1 of the outlet port 8 provided in the water pump 1, and the rear end chamber 23 may be in communication with the rear end discharge region 8-2 of the outlet port 8 provided in the water pump 1.

The valve seat 25 may separate the front end chamber 21 and the rear end chamber 23 from each other. Additionally, the valve seat 25 may separate the front end chamber 21 and the rear end chamber 23 from each other when a valve body 31 of the switching valve 30 is pressed against the valve seat 25, whereas the valve seat 25 allows the front end chamber 21 and the rear end chamber 23 to communicate with each other when the valve body 31 of the switching valve 30 is spaced apart from the valve seat 25. Therefore, the valve seat 25 may be integrated with the front end chamber 21 and the rear end chamber 23 and may include a chamber communication aperture formed corresponding to the shape of the valve body 31 for communicating between the front end chamber 21 and the rear end chamber 23. In particular, the chamber communication aperture may have a stepped cross-sectional structure.

For example, the guide aperture 27 may be formed in the bottom surface of the front end chamber 21 and may be formed as a passage through which a reservoir 33 of the switching valve 30 may enter the front end chamber 21 and exit therefrom. In particular, the valve housing 20 may further include a separate third chamber separated by the valve seat from the front and rear end chambers 21 and 23 set as first and second chambers. The third chamber may lead to any one of an EGR cooler 120-1, an oil cooler 120-2, and the heater 130 (see FIG. 5), instead of the engine 70, through the coolant line for direct supply of engine coolant.

The switching valve 30 may include the valve body 31, the reservoir 33, and the temperature reactant 35, and may be opened according to the temperature of coolant. Through such a configuration, the operation (i.e., opening) of the switching valve 30 allows the front end chamber 21 and the rear end chamber 23 to communicate with each other by fully separating the valve body 31 from the valve seat 25 by the downward movement of the valve body 31 exiting from the guide aperture 27 of the front end chamber 21 when the temperature reactant 35 comes into contact with the high-temperature coolant of about 100° C. or greater.

For example, the valve body 31 may be formed as a plate to block the chamber communication aperture when pressed against (e.g., in an abutting manner) the stepped cross-sectional chamber communication aperture of the valve seat 25. Particularly, the valve body 31 may include a piston aperture formed therein and may be fixed in a state in which at a moving piston 43 of the piston 40 is fitted in the piston aperture. The valve body 31 and the moving piston 43 may be fixed by interference fit using a piston aperture diameter difference or by welding or fusion using a piston aperture periphery.

For example, the reservoir 33 may have a box shape in which the internal space thereof may be filled with the temperature reactant 35, and may be integrated with the valve body 31 by fixing the open inlet of the reservoir 33 to one side (e.g., a lower surface from among upper and lower surfaces) of the valve body 31. Therefore, the valve body 31 and the reservoir 33 may be fixed by plastic injection molding or fusion. The temperature reactant 35 may be made of a thermal expansion material that expands at a high temperature while contracting at a low temperature in response to the temperature of coolant, and may be made of wax. In particular, the temperature reactant 35 may be received and sealed in the reservoir 33 to be protected from the outside.

In particular, the characteristics of the temperature reactant 35 allow coolant to flow only to the cylinder head 70-2 through the front end discharge region 8-1 in the cold condition (A) where the coolant temperature is less than about 100° C. and in the high-temperature condition (B) (see FIG. 3), such as in the thermal valve closing (flow only to head) illustrated in the left lower end of FIG. 4. On the other hand, the temperature reactant 35 may be fully expanded to operate (i.e., open) the valve in the hot condition (C) where the coolant temperature is about 100° C. or greater to discharge coolant to the cylinder head 70-2 through the front end discharge region 8-1 and simultaneously to the cylinder block 70-1 through the rear end discharge region 8-2, such as in the thermal valve operating (i.e., opening) (flow to head+block) illustrated in the right lower end of FIG. 4.

As described above, the temperature reactant 35 may be set to have temperature response characteristics that it is gradually expanded in the high-temperature condition (B) where the coolant temperature is from about 90° C. to less than about 100° C. and is fully expanded in the hot condition (C) where the coolant temperature is about 100° C. or greater. In particular, the piston 40 may include a fixed piston 41 fixed in the rear end chamber 23 of the valve housing 20, and a moving piston 43 fixed to the valve body 31 of the switching valve 30 and enclosing the fixed piston 41.

For example, the fixed piston 41 may be formed in the shape of a rod bar having a predetermined length. The end of the fixed piston 41 may be fixed in the rear end chamber 23 of the valve housing 20 by fusion, fitting, or injection molding so that the moving piston 43 moves down together with the valve body 31 of the switching valve 30. The moving piston 43 may have a hollow pipe structure and may enclose the fixed piston 41 while fixed to the valve body 31 of the switching valve 30. The valve spring 50 may be a coil spring compressed by the valve body 31 moving down when the switching valve 30 is operated (i.e., opened) by expansion of the temperature reactant 35. Accordingly, although the valve spring 50 may be a leaf spring or a coil spring, it is preferably a coil spring.

Figure 5:
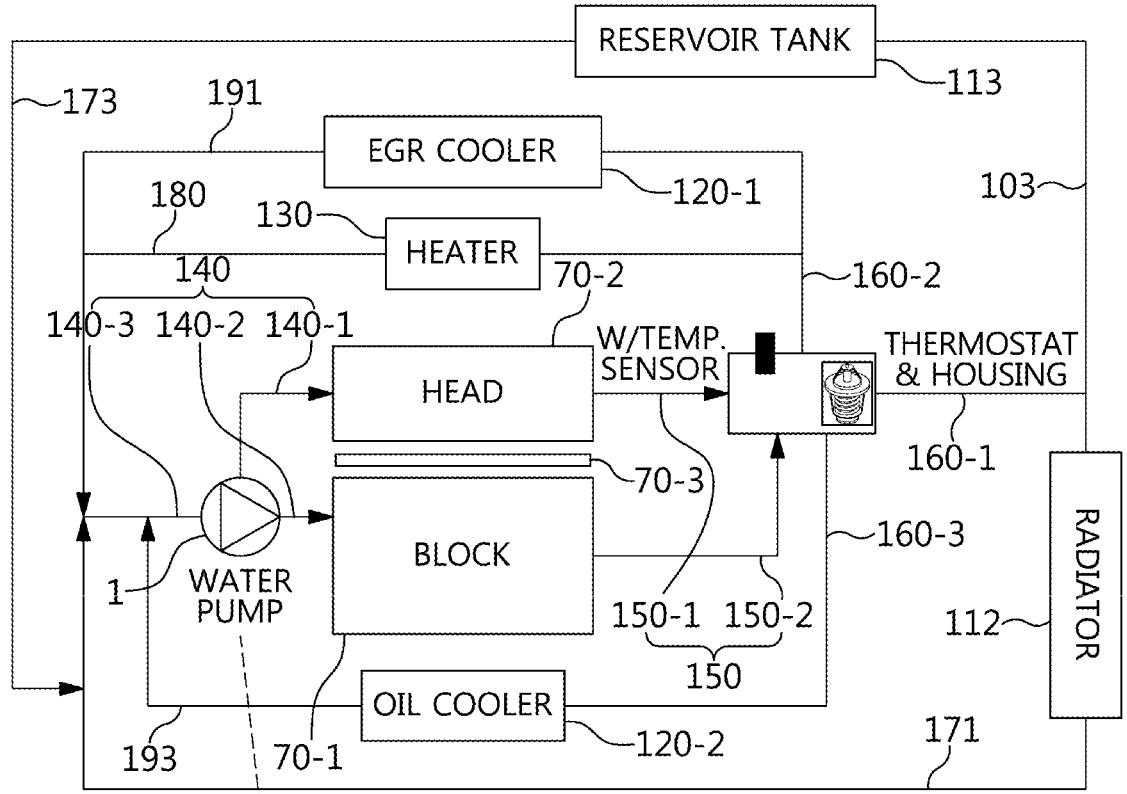
FIG. 5 illustrates an engine cooling system using the temperature responsive variable water pump according to an exemplary embodiment of the present invention.
Figure 5:
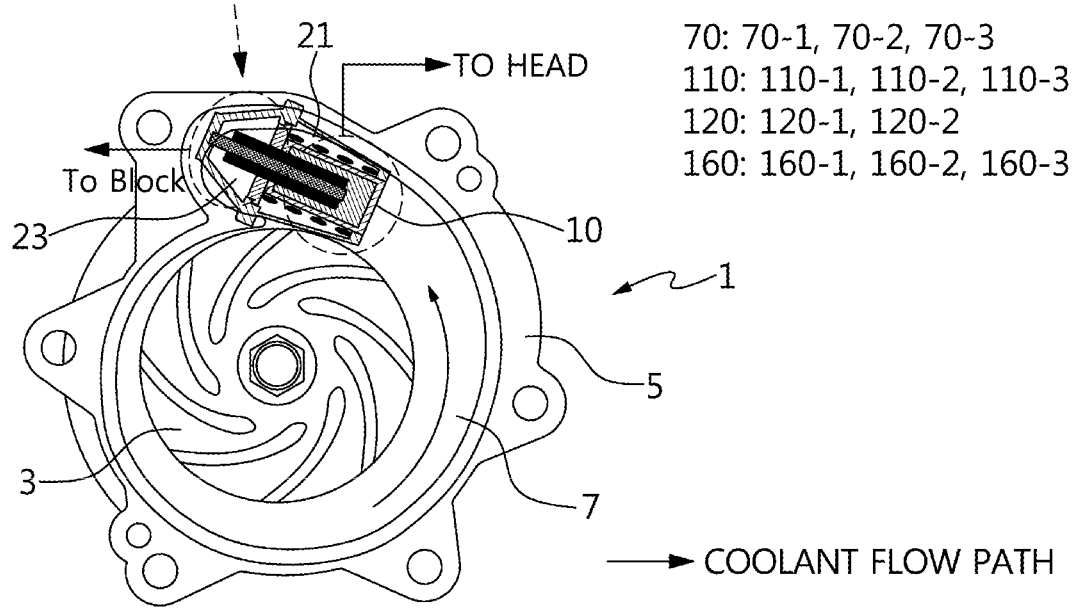

FIG. 5 illustrates a configuration of an engine cooling system 100 using the temperature responsive variable water pump 1. As illustrated in the drawing, the engine cooling system 100 may include a water pump 1, an engine 70, a coolant circulation device 110, a cooler 120, a heater 130, and a coolant line. In particular, the engine 70 may include a cylinder block 70-1, a cylinder head 70-2, a gasket 70-3, and a water pump mounting block 80.

For example, the cylinder block 70-1 may define a combustion chamber in which a piston reciprocates and a coolant circulation passage, the cylinder head 70-2 may include a valve train connected to a camshaft and may define a coolant circulation passage, and the gasket 70-3 may be positioned between the cylinder block 70-1 and the cylinder head 70-2 and may have a closed structure to prevent coolant from circulating in the cylinder block 70-1 and the cylinder head 70-2. Accordingly, the gasket 70-3 has no coolant aperture for the pass of coolant, and thus differs from the existing gasket having a coolant aperture.

For example, the water pump mounting block 80 may include a coolant inlet port 81, a coolant chamber 83, and a partitioned coolant passage port 85 divided into a head passage port 85-1 and a block passage port 85-2, as in FIG. 2. In particular, the coolant circulation device 110 may include a thermostat 111, a radiator 112, a reservoir tank 113, a cooler 120, and a heater 130.

For example, the thermostat 111 may be closed at a coolant temperature of less than about 90° C. as in FIG. 3, may be gradually opened at a coolant temperature from about 90° C. to less than 100° C., and then may be fully opened at a temperature of about 100° C., thereby forming a coolant circulation flow in the coolant line. Accordingly, the thermostat 111 may include a temperature sensor. In particular, the thermostat 111 may include a five-way valve (e.g., two inlets and three outlets) to respectively connect a head line 150-1 and a block line 150-2 to the two inlets and a main discharge line 160-1, and respectively connect a first sub-discharge line 160-2, and a second sub-discharge line 160-3 to the three outlets.

The radiator 112 may be configured to perform heat exchange between coolant and the atmosphere to decrease the temperature of the coolant. The reservoir tank 113 may store coolant therein. For example, the cooler 120 may include an exhaust gas recirculation (EGR) cooler 120-1 configured to decrease the temperature of EGR gas branched from exhaust gas, and an oil cooler 120-2 configured to decrease the temperature of engine oil circulating in the engine 70, which are components of an EGR system.

For example, the heater 130 may be configured to increase the temperature of outside air using high-temperature engine coolant for vehicle heating. The coolant line may include a water pump line 140, an engine line 150, a thermostat line 160, a radiator line 171, a reservoir tank line 173, a heater line 180, an EGR cooler line 191, and an oil cooler line 193. In particular, the water pump line 140 may be connected from the water pump 1 to the cylinder block 70-1 and the cylinder head 70-2 of the engine 70. Accordingly, the water pump line 140 may be divided into a water pump introduction line 140-1, a water pump front-end discharge line 140-2, and a water pump rear-end discharge line 140-3.

The water pump introduction line 140-1 allows coolant to flow into the water pump 1. The water pump front-end discharge line 140-2 leads to the cylinder head 70-2 through the front end discharge region 8-1 in communication with the front end chamber 21 formed by the thermal valve 10 of the water pump 1, and the water pump rear-end discharge line 140-3 leads to the cylinder block 70-1 through the rear end discharge region 8-2 in communication with the rear end chamber 23 formed by the thermal valve 10 of the water pump 1.

Further, the engine line 150 may be connected to the cylinder block 70-1 and the cylinder head 70-2 by the thermostat 111. Accordingly, the engine line 150 may include a head line 150-1 leading to a first inlet of the two inlets of the thermostat 111 from the cylinder head 70-2, and a block line 150-2 leading to a second inlet of the two inlets of the thermostat 111 from the cylinder block 70-1. The thermostat line 160 may be connected from the thermostat 111 to the radiator 112, the EGR cooler 120-1, the oil cooler 120-2, and the heater 130.

Accordingly, the thermostat line 160 may include a main discharge line 160-1 leading to the radiator 112 from a first outlet of the three outlets of the thermostat 111, a first sub-discharge line 160-2 leading to the EGR cooler 120-1 and the heater 130 from a second outlet of the three outlets of the thermostat 111, and a second sub-discharge line 160-3 leading to the oil cooler 120-2 from a third outlet of the three outlets of the thermostat 111.

Particularly, the radiator line 171 may be connected to the main discharge line 160-1 of the thermostat 111 and the water pump introduction line 140-1 of the water pump 1 via the radiator 112 to form a closed circuit. The reservoir tank line 173 may be connected to the main discharge line 160-1 of the thermostat 111 and the radiator line 171 via the reservoir tank 113 to form a closed circuit. Additionally, the reservoir tank line 173 leads to the radiator line 171 being connected to the water pump introduction line 140-1 of the water pump 1.

The heater line 180 may be connected to the first sub-discharge line 160-2 of the thermostat 111 and the water pump introduction line 140-1 of the water pump 1 via the heater 130 to form a closed circuit. The EGR cooler line 191 may be connected to the water pump introduction line 140-1 of the water pump 1 via the EGR cooler 120-1 to form a closed circuit. In addition, the oil cooler line 193 may be connected to the water pump introduction line 140-1 of the water pump 1 via the oil cooler 120-2 to form a closed circuit.

Therefore, the engine cooling system 100 may be configured to adjust the flow rate of coolant based on the cold condition (A)/the high-temperature condition (B)/the hot condition (C) (see FIG. 3) by opening the temperature responsive variable thermal valve 10 of the water pump 1 when coolant circulates in the coolant lines 140, 150, 160, 171, 173, 180, 191, and 193 through the adjustment of the five-way valve of the thermostat 111.

The adjusting of the flow rate of coolant according to the temperature condition will be described through the operation of the engine cooling system 100 with reference to FIGS. 6 to 8. Particularly, although the thermal valve 10 is operated (i.e., opened) in a direction against the force for fluid flow, it will be described as being operated (i.e., opened) in a direction opposite to the direction in which the fluid is discharged from the water pump 1 to the outlet port 8 in consideration of the configuration of the engine cooling system 100.

Figure 6:
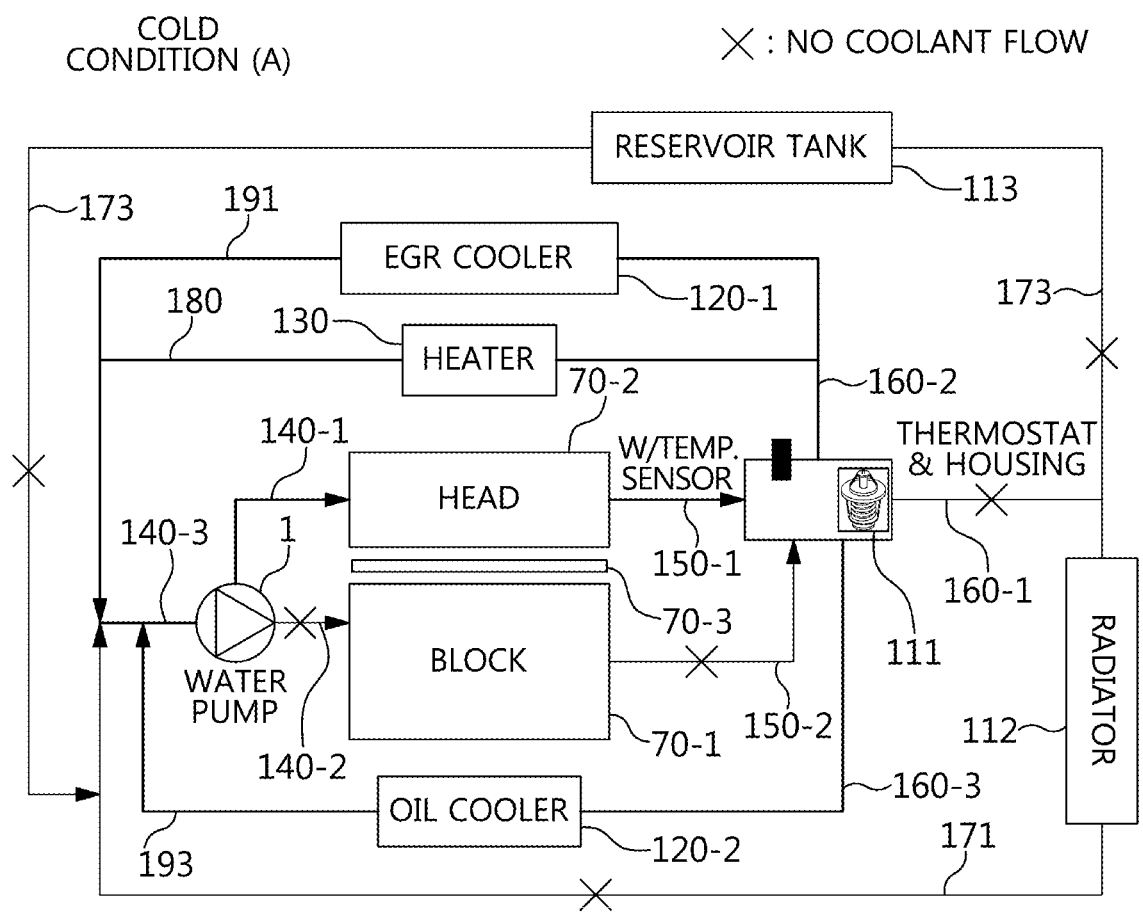
FIG. 6 illustrates an example in which the temperature responsive variable water pump is operated in a cold condition in the engine cooling system according to an exemplary embodiment of the present invention.

Referring to the operation in the cold condition of FIG. 6, the operation of the engine 70 drives the water pump 1 to supply the engine coolant to the outlet port 8, but the switching valve 30 is not operated (i.e., closed) since the temperature reactant 35 of the thermal valve 10 comes into contact with the engine coolant having a temperature of less than about 90° C. in the initial stage of operation of the engine 70.

Therefore, the engine coolant may be discharged to the front end discharge region 8-1 of the outlet port 8 through the front end chamber 21 when the rear end chamber 23 is blocked by the valve body 31 of the thermal valve 10, and may flow to the head passage port 85-1 of the partitioned coolant passage port 85. As a result, a minimal amount of engine coolant may be supplied to the cylinder head 70-2 of the engine 70. In particular, the water pump 1 may be configured to pump engine coolant at a constant flow rate as in the cold condition (A) of FIG. 3, which is the same as the initial operating state of the engine 70. In addition, since the temperature of the engine coolant is less than about 90° C. in the thermostat 111, the main discharge line 160-1 leading to the radiator 112 may be closed and the first and second sub-discharge lines 160-2 and 160-3 may be opened.

As a result, in the engine cooling system 100, the coolant may flow in the closed circuit formed by the water pump introduction line 140-1, the water pump front-end discharge line 140-2, the head line 150-1, the first sub-discharge line 160-2, the second sub-discharge line 160-3, the heater line 180, the EGR cooler line 191, and the oil cooler line 193. On the other hand, in the engine cooling system 100, the coolant may be prevented from flowing in the water pump rear-end discharge line 140-3, the block line 150-2, the main discharge line 160-1, the radiator line 171, and the reservoir tank line 173. In particular, the engine coolant introduced into the cylinder head 70-2 may be prevented from flowing to the cylinder block 70-1 by the sealing action of the gasket 70-3.

Figure 7:
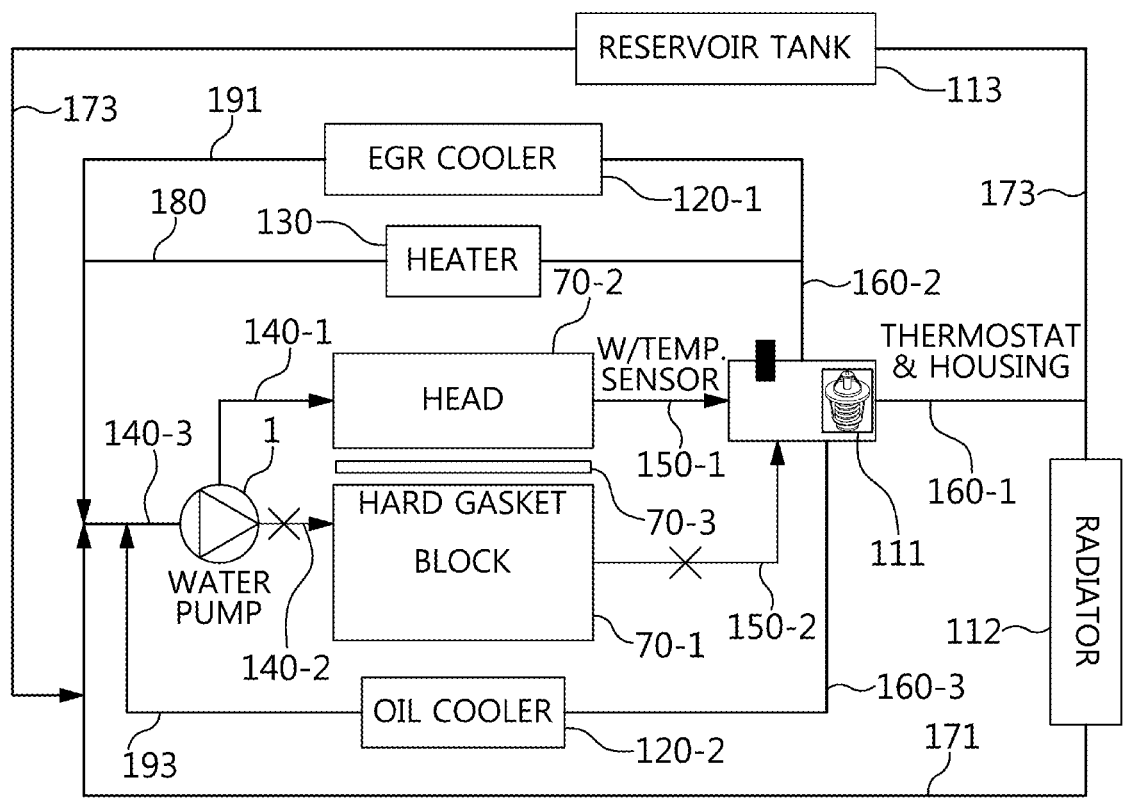
FIG. 7 illustrates an example in which the temperature responsive variable water pump is operated in a high-temperature condition in the engine cooling system according to an exemplary embodiment of the present invention.

Referring to the operation in the high-temperature condition of FIG. 7, the temperature of engine coolant increases to about 90° C. due to the continuous operation of the engine 70 and thus, the temperature reactant 35 of the thermal valve 10 starts to expand in response to the temperature. However, since the expansion force of the temperature reactant 35 is insufficient that the switching valve 30 of the thermal valve 10 overcomes the elastic repulsive force of the valve spring 50 and moves down, the rear end chamber 23 may be maintained blocked.

Further, the expansion force of the temperature reactant 35 may gradually increase as the temperature of engine coolant is increased from about 90° C. to 100° C. In this case, however, the switching valve 30 may be maintained as it is in a state in of overcoming the elastic repulsive force of the valve spring 50. Therefore, the engine coolant may be discharged only through the front end chamber 21 not through the rear end chamber 23, and may be supplied to the cylinder head 70-2. The water pump 1 may be configured to increase the pumping flow rate of the engine coolant in proportion to the increase of the coolant temperature as in the high-temperature condition (B) of FIG. 3.

In addition, since the temperature of engine coolant is about 90° C. or greater in the thermostat 111, the main discharge line 160-1 leading to the radiator 112 may also be opened. As a result, in the engine cooling system 100, the coolant may flow in the closed circuit formed by the water pump introduction line 140-1, the water pump front-end discharge line 140-2, the head line 150-1, the main discharge line 160-1, the first sub-discharge line 160-2, the second sub-discharge line 160-3, the heater line 180, the EGR cooler line 191, and the oil cooler line 193. In particular, the engine coolant introduced into the cylinder head 70-2 may be prevented from flowing to the cylinder block 70-1 by the sealing action of the gasket 70-3.

Figure 8:
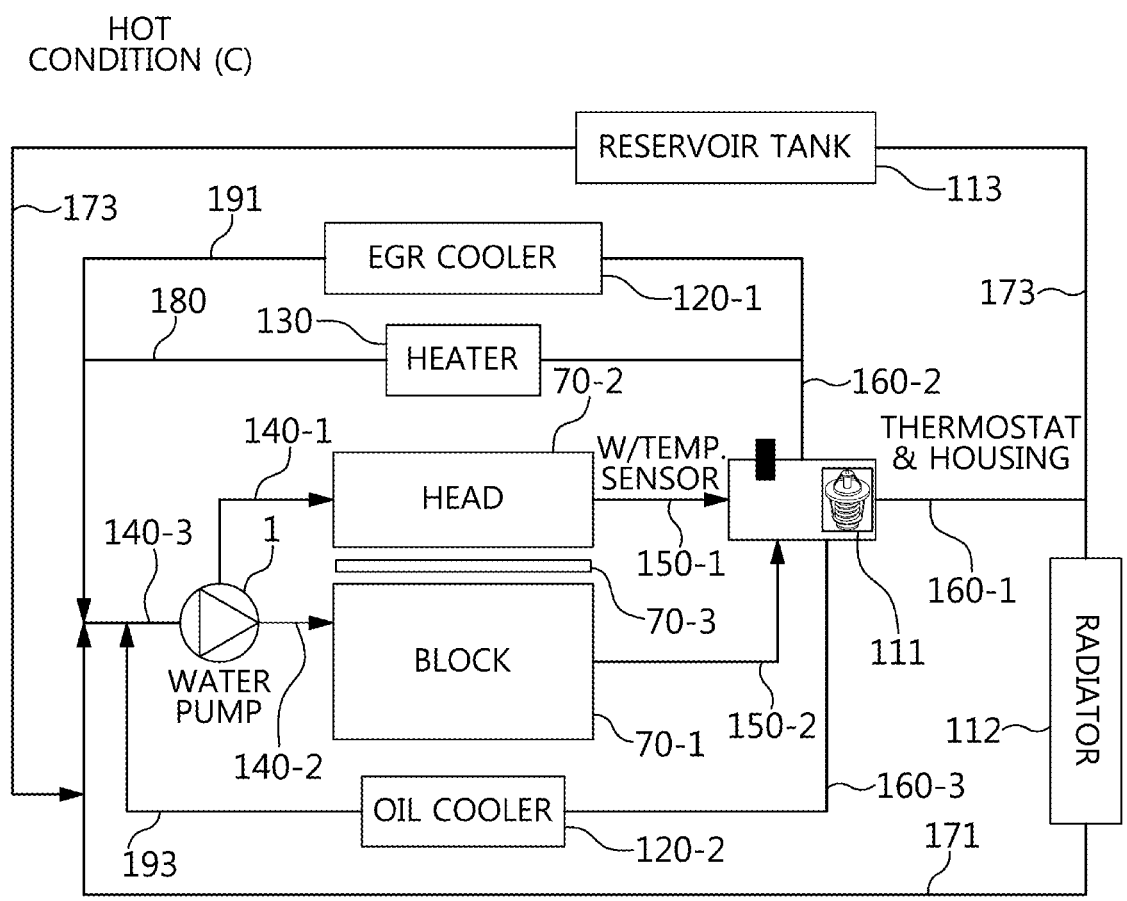
FIG. 8 illustrates an example in which the temperature responsive variable water pump is operated in a hot condition in the engine cooling system of the present invention.

Referring to the operation in the hot condition of FIG. 8, the temperature of engine coolant increases to about 100° C. or greater due to the continuous operation of the engine 70 and thus, the engine coolant may be discharged through both the front end chamber 21 and the rear end chamber 23 of the thermal valve 10. In other words, the expansion force of the temperature reactant 35 is maximum when the temperature of engine coolant reaches a temperature of about 100° C., and thus, the switching valve 30 overcomes the elastic repulsive force of the valve spring 50 and the operating (i.e., opening) of the switching valve 30 may be completed.

Accordingly, the engine coolant may be discharged to the rear end discharge region 8-2 through both the front end chamber 21 and the rear end chamber 23, and may also flow to the block passage port 85-2 of the partitioned coolant passage port 85. In particular, the completion of the operating (i.e., opening) of the switching valve 30 indicates that the flow rate of the engine coolant discharged through the rear end chamber 23 is maximized as the pumping flow rate of the engine coolant is increased in proportion to the increase of the coolant temperature. Therefore, the engine coolant pumped by the water pump 1 may be supplied to the cylinder block 70-1 and the cylinder head 70-2 of the engine 70, and particularly, a maximum amount of engine coolant may be supplied to the cylinder block 70-1.

As a result, in the engine cooling system 100, the coolant may flow in the closed circuit formed by the water pump introduction line 140-1, the water pump front-end discharge line 140-2, the water pump rear-end discharge line 140-3, the head line 150-1, the block line 150-2, the main discharge line 160-1, the first sub-discharge line 160-2, the second sub-discharge line 160-3, the heater line 180, the EGR cooler line 191, and the oil cooler line 193. In particular, the engine coolant introduced into the cylinder block 70-1 and the cylinder head 70-2 may be prevented from flowing to the cylinder block 70-1 and the cylinder head 70-2 by the sealing action of the gasket 70-3.

As described above, the water pump 1 of the engine cooling system 100 according to the present exemplary embodiment may include the thermal valve 10, dividing the outlet space of the pump housing of the outlet port 8, through which the engine coolant pumped into the internal space of the pump housing 5 is discharged, into the front end discharge region 8-1 and the rear end discharge region 8-2, and forming a dual flow path through which the engine coolant is discharged to the front end discharge region 8-1 and the rear end discharge region 8-2 according to the increase of the coolant temperature, to separately adjust the cooling of the cylinder block 70-1 and the cylinder head 70-2 of the engine 70. Accordingly, an improvement in fuel efficiency and performance may be realized through flow optimization as well as rapid response and accurate control by adjusting the discharge flow rate of the water pump 1 corresponding to the temperature of coolant according to the operating conditions of the engine.

As is apparent from the above description, since the water pump of the present invention may be configured to implement a variable flow rate with the thermal valve responsive to the coolant temperature of the engine, both the engine cooling system and the water pump have the following actions and effects.

First, the mechanical water pump implements the variable flow control of the variable water pump, and thus, price competitiveness is significantly increased. Second, since the simplified structure of the mechanical water pump is maintained as it is together with implementation of variable flow control, it may be advantageous in terms of durability and mounting of the water pump. Third, the performance of the engine cooling system may be improved by adjusting the discharge flow rate of the water pump based on the temperature of coolant and the fuel efficiency may be improved since the head and the block of the engine are cooled separately by the flow control.

Fourth, the flow rate of the water pump may be decreased in the initial cold condition to rapidly increase coolant and oil temperatures, thereby reducing the friction in the engine. Fifth, the heating performance of the engine cooling system may be improved by reducing the warm-up speed of the engine. Sixth, since the engine cooling system may be operated to maximize the flow rate of coolant when the temperature of coolant is high, the cooling performance of the engine may be improved and the durability of the engine may be ensured.

While the present invention has been described with respect to the specific exemplary embodiments, it will be apparent to those skilled in the art that various changes and modifications may be made without departing from the spirit and scope of the invention as defined in the following claims.

What is claimed is:

1. A water pump, comprising:
a thermal valve through which a coolant as a fluid flows selectively in two flow directions within an outlet space of a pump housing, wherein the thermal valve includes:
a valve housing for dividing the outlet space of the pump housing into a front end chamber and a rear end chamber;
a switching valve configured to selectively switch the front and rear end chambers between a blocked state and a communicated state;
a temperature reactant that applies an expansion force by a temperature of the fluid to the switching valve such that a dual flow path is defined to form a fluid flow through the front end chamber and a fluid flow through the rear end chamber; and
a piston configured to support and move together with the switching valve when the switching valve is fixed to the valve housing,
wherein the switching valve is positioned at the front end chamber and is moved in a direction away from the rear end chamber, and
wherein the piston comprises a fixed piston that is fixed in the valve housing and a moving piston that is fixed to the switching valve, and the fixed piston is configured to be fitted to the moving piston to support movement of the moving piston.

2. The water pump of claim 1, wherein the thermal valve is operated by a variation in temperature of the fluid to define the dual flow path.

3. The water pump of claim 2, wherein the thermal valve is operated in a direction opposite to a direction in which the fluid is discharged.

4. The water pump of claim 1, wherein the thermal valve is operated by an expansion force of wax expanded by a temperature of the fluid.

5. The water pump of claim 1, wherein the thermal valve is positioned at an outlet port that defines the outlet space of the pump housing.

6. The water pump of claim 5, wherein the outlet space of the pump housing is divided into two parts by the thermal valve to define the dual flow path.

7. The water pump of claim 1, wherein the valve housing defines a flow passage therein through which the fluid introduced into the outlet space of the pump housing is discharged to the front end chamber when the rear end chamber is blocked by the switching valve, and at the same time the flow passage is defined by the front and rear end chambers in communication with each other by operation of the switching valve.

8. The water pump of claim 1, wherein the temperature reactant is enclosed by a reservoir, and the reservoir is coupled to the switching valve to move the switching valve by the expansion force of the temperature reactant.

9. The water pump of claim 8, wherein the expansion force of the temperature reactant is blocked by an elastic repulsive force of a valve spring, and the switching valve is moved when the expansion force is greater than the elastic repulsive force.

10. The water pump of claim 9, wherein the valve spring elastically supports the switching valve in the front end chamber of the valve housing.

11. An engine cooling system, comprising:
the water pump of claim 1; and
an engine including a cylinder head supplied with engine coolant through a front end discharge region and a cylinder block supplied with the engine coolant through a rear end discharge region,
wherein the water pump includes the thermal valve for dividing the outlet space of the pump housing of an outlet port, through which the engine coolant pumped into an internal space of the pump housing is discharged, into the front end discharge region and the rear end discharge region and for defining the dual flow path through which the engine coolant is discharged to the front end discharge region and the rear end discharge region based on an increase in temperature of the coolant.

12. The engine cooling system of claim 11, wherein the thermal valve of the water pump includes wax therein, wherein the wax is thermally expanded by the temperature of the engine coolant and is fully expanded when a temperature of the engine is greater than a predetermined temperature to define the dual flow path.

13. The engine cooling system of claim 11, wherein the engine includes a water pump mounting block for mounting the water pump, and the water pump mounting block is formed with a head passage port leading to the cylinder head from the front end discharge region, and a block passage port leading to the cylinder block from the rear end discharge region.

* * * * *